United States Patent [19]

Duret

[11] Patent Number: 4,890,594
[45] Date of Patent: Jan. 2, 1990

[54] DEVICE FOR THE PNEUMATIC INJECTION OF FUEL INTO A CYLINDER OF AN INTERNAL COMBUSTION ENGINE

[75] Inventor: Pierre Duret, Paris, France

[73] Assignee: Institut Francais du Petrole, Rueil Malmaison, France

[21] Appl. No.: 275,521

[22] Filed: Nov. 23, 1988

[30] Foreign Application Priority Data

Nov. 27, 1987 [FR] France ................... 87 16613

[51] Int. Cl.⁴ .......................................... F02M 23/00
[52] U.S. Cl. .................................................. 123/531
[58] Field of Search ............... 123/531, 452, 432, 533; 239/5, 459, 533.3

[56] References Cited

U.S. PATENT DOCUMENTS

| | | |
|---|---|---|
| 4,313,410 | 2/1982 | Kunii et al. ........................ 123/531 |
| 4,556,037 | 12/1985 | Wisdom ............................. 123/533 |
| 4,628,888 | 12/1986 | Duret ................................. 123/531 |
| 4,709,681 | 12/1987 | Rozsus .............................. 123/531 |
| 4,712,524 | 12/1987 | Suniter et al. ..................... 123/531 |
| 4,759,335 | 7/1988 | Rogg et al. ........................... 239/5 |
| 4,781,164 | 11/1988 | Seebar et al. ..................... 123/533 |

Primary Examiner—Raymond A. Nelli
Attorney, Agent, or Firm—Antonelli, Terry & Wands

[57] ABSTRACT

A device is provided for the pneumatic injection of fuel into a cylinder of an internal combustion engine, comprising an injection chamber in communication with the inner chamber of the cylinder through two orifices with each of which a valve is associated. The injector comprises two outlet channels each directed towards one of the orifices of said injection chamber. The valves are controlled so as to open and close simultaneously. The invention applies in particular to high power two-stroke engines.

8 Claims, 1 Drawing Sheet

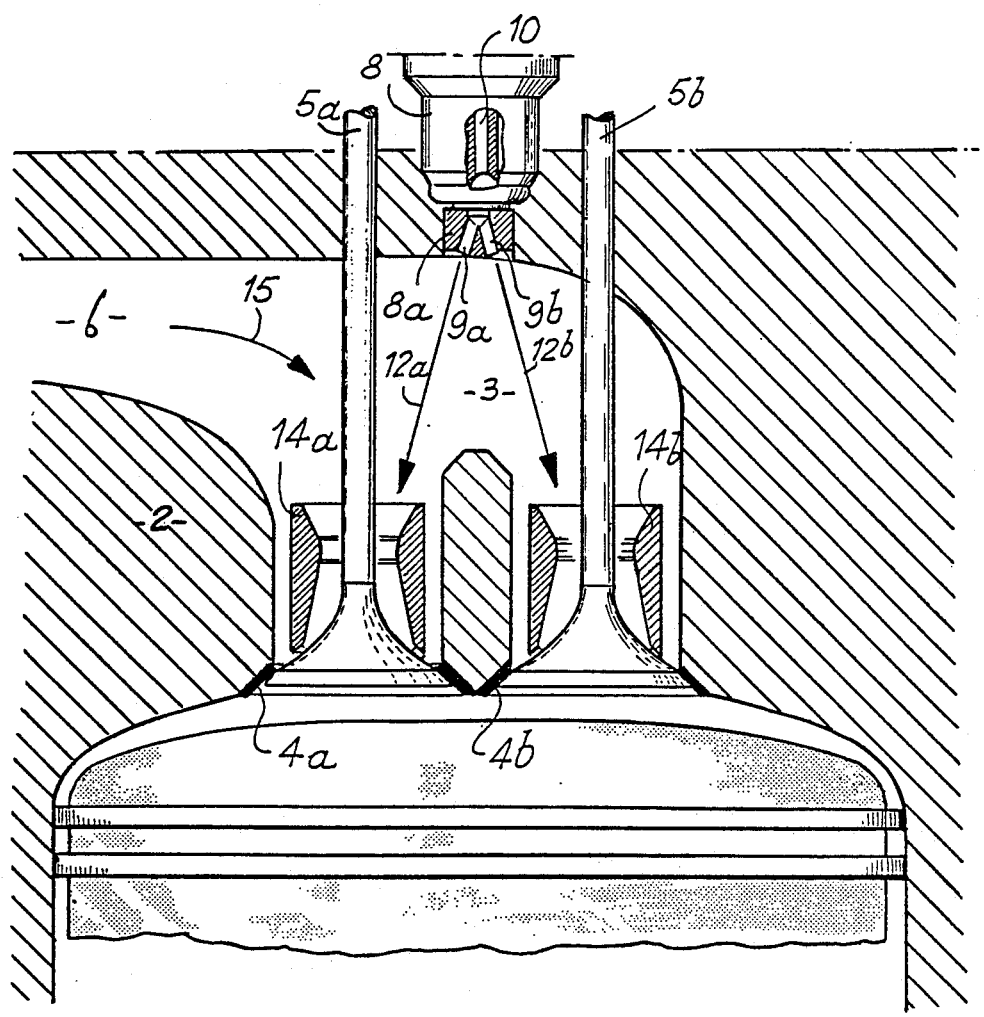

DEVICE FOR THE PNEUMATIC INJECTION OF FUEL INTO A CYLINDER OF AN INTERNAL COMBUSTION ENGINE

BACKGROUND OF THE INVENTION

The invention relates to a device for the pneumatic injection of fuel into a cylinder of an internal combustion engine and more particularly, but not exclusively, a pneumatic injection device for a two-stroke engine.

Two-stroke engines are known having one or more cylinders with, associated with each of the cylinders, a pneumatic fuel injection device for atomizing a liquid fuel by means of a pressurized gas which is generally compressed air and feeding the carburetted mixture obtained into the cylinder of the engine. The cylinder is fed with and swept by the fresh air independently of the pneumatic fuel injection which is initiated at a given time during the operating cycle of the engine.

The pneumatic fuel injection device comprises a chamber which may be placed in communication with the inner chamber of the cylinder through at least one valve controlled by a cam. The injection chamber is fed with pressurized gas which may come either from an auxiliary reservoir or from a part of the engine producing this pressurized gas.

In particular, it has been proposed to feed the injection device with compressed air from a capacity which is recharged by the pump housing providing the fresh air supply and scavenging of the cylinder of the engine.

In the case of high power engines, the amounts of fuel injected into the cylinder are very considerable and require either a high amplitude lift of the valve placing the injection chamber in communication with the cylinder, or the use of a large diameter valve. By high power engine is meant more particularly engines delivering more than 25 to 30 kW per cylinder.

In the case of very large engines, it is not possible to increase the diameter of the valves beyond a certain limit, since the inertia of the valve then becomes excessive. Similarly, it is not possible to increase the lift amplitude or time beyond a certain limit.

In the case of large engines, it has been proposed to divide the injection device of each of the cylinders into two, using two valves and two liquid fuel injectors per cylinder. The drawbacks of this approach are however that the cost price of the engine is considerably increased and its adjustment is delicate.

SUMMARY OF THE INVENTION

The purpose of the invention is then to provide a device for the pneumatic injection of fuel into a cylinder of an internal combustion engine comprising a chamber which may be placed in communication with the inner chamber of the cylinder through at least one valve controlled for injection at a given time in the operating cycle of the engine, and fed with pressurized gas through a duct and with liquid fuel through a liquid injector, opening into the injection chamber, this device intended for a high power engine being capable of feeding large amounts of fuel into the chamber of the cylinder while being simple in structure and of low cost price making it possible to simplify the adjustment of the engine.

To this end, the injection chamber comprises two orifices opening into the chamber of the cylinder with each of which is associated a valve and the injector comprises two outlet channels each directed to one of the orifices of the injection chamber.

BRIEF DESCRIPTION OF THE DRAWING

For a better understanding of the invention, one embodiment of an injection device in accordance with the invention for a two-stroke engine will now be described, by way of non limitative example, with reference to the accompanying drawing, in which:

The single FIGURE is a sectional view of the chamber of the injection device communicating with the upper part of the cylinder of a two-stroke engine.

DESCRIPTION OF THE PREFERRED EMBODIMENT

In the figure, the upper part of the chamber of a cylinder 1 of a two-stroke engine can be seen which is covered and defined by a cylinder head 2 in which is formed the chamber 3 of an injection device. Chamber 3 opens into cylinder 1, at the level of two circular orifices 4a and 4b through which the fuel mixture is injected. The cylinder head is machined and faced at the level of orifices 4a and 4b so as to form two seats on which the heads of two valves 5a and 5b come to bear respectively. Valves 5a and 5b comprise rods mounted for sliding in the cylinder head 2 and associated at their ends with a cam and spring control device for opening and closing the valves 5a and 5b at given times during the operating cycle of the engine.

The control device causes simultaneous opening and closing of valves 5a and 5b.

The cylinder head is machined so as to form a channel 6 opening into chamber 3 for supplying this injection chamber 3 with pressurized gas.

Preferably, channel 6 is connected to a capacity in which compressed air is stored, for example from the pump housing communicating with the lower end of cylinder 1 and providing the fresh air supply and scavenging of the cylinder through one or more transfer ducts.

A liquid fuel injector 8 is mounted inside the cylinder head so that its outlet nozzle 8a opens into the upper part of the injection chamber 3. Injector 8 is a twin jet injector whose outlet nozzle 8a comprises two channels 9a and 9b equally slanted with respect to the vertical and fed from a single channel 10.

When injector 8 is operating, as shown in the figure, two jets 12a and 12b of liquid fuel are directed simultaneously towards the orifices 4a and 4b respectively.

Nozzles 14a and 14b are disposed at the lower part of the injection chamber 3, at the level of orifices 4a and 4b respectively. These nozzles 14a and 14b may be advantageously formed by venturis as described in the patent 2 575 521 filed jointly by the Institut Francais du Pétrole and the firms Sociétés Automobiles Peugeot and Automobiles Citroën. Jets 12a and 12b are directed so as to reach the zone of apertures 4a and 4b, at the lower part of the injection chamber 3, through nozzles 14a and 14b.

At the time of simultaneous opening of valves 5a and 5b, the pressurized air fed by channel 6 into chamber 3 (arrow 15) penetrates into this chamber at high speed, the pressure in the cylinder being, at the time of pneumatic injection, very much less than the pressure of the compressed air in the capacity connected to channel 6. The compressed air penetrates into nozzles 14a and 14b where it is further accelerated and causes atomization of the liquid fuel fed into chamber 3, through injector 8, in the form of jets 12a and 12b. The compressed air containing the atomized fuel droplets in suspension penetrates into the chamber of cylinder 1 where it is mixed with the fresh scavenging air fed into the cylinder through a means independent of pneumatic injection device.

During injection, valves 5a and 5b are open simultaneously, their respective heads being moved away from the seats surrounding apertures 4a and 4b. The flow section for the fuel in suspension in the compressed air is then twice the flow section uncovered by any one of the two valves. At the time of closure, the two valve heads are applied against the seats surrounding orifices 4a and 4b respectively for simultaneously closing the two communication passages between the injection chamber 3 and the chamber of cylinder 1. The simultaneous operation of valves 5a and 5b may be provided by using a single cam or two perfectly synchronized cams. Valves 5a and 5b of identical size may thus, when they open, uncover an appreciable flow section for the fuel in suspension in the compressed air, while having heads whose diameter is limited. Each of the valves thus has a limited weight and inertia, which is favorable for the operation of the high speed engine.

Furthermore, injector 8 introduces into chamber 3, at the level of venturis 14a and 14b, in the form of two identical jets 12a and 12b, a double amount of liquid fuel with respect to that which would be introduced by a single injector associated with a single valve such as 5a and 5b. Jets 12a and 12b coming from channels 9a and 9b of identical section and fed from a single channel 10 have perfectly identical flow rates and speeds. The adjustment of the injection device is then particularly simple since this injection device comprises two identical assemblies operating simultaneously for the feeding of equal amounts of fuel.

Thus, considerable fuel amounts may be fed into the chamber of the cylinder without using overdimensioned valves and an injection assembly requiring complex adjustment.

The invention is not limited to the embodiment which has been described.

Thus, it is possible to equip at least one of the fuel intake orifices 4a and 4b with a member deflecting the carburetted mixture jet, such as described in the patent application 2 575 522 filed jointly by the Institut Francais du Pétrole and the firms Sociétés Automobiles Peugeot and Automobiles Citroën. The members for deflecting the carburetted mixture jet may each be machined in an annular part also forming the seat of the corresponding valve.

In a particularly interesting embodiment, each of the two orifices is provided with a deflector. Each of these deflectors may be oriented so as to optimize the scavenging and combustion in the engine. Thus, in some cases, the deflectors may orient the jets in different directions. For example, in the case of a two-stroke engine having several transfer ports distributed on each side of the median axial plane of the cylinder passing through the exhaust port, the deflectors may be oriented for directing the jets on each side of the median plane in the direction of the transfer port.

The pneumatic injection device of the invention may be used not only in the case of two-stroke engines, but also in the case of internal combustion reciprocal engines with one or more cylinders.

What is claimed is:

1. A device for the pneumatic injection of fuel into a cylinder of an internal combustion reciprocating engine, comprising an injection chamber which may be placed in communication with the inner chamber of the cylinder through at least one valve controlled for injection at a given time in the operating cycle of the engine, the injection chamber being fed with pressurized gas through a duct and with liquid fuel through a liquid injector, opening in the injection chamber, wherein said injection chamber comprises two orifices opening into the chamber of the cylinder, with each of which is associated a valve and said injector comprises two outlet channels each directed to one of the orifices of the injection chamber.

2. The injection device as claimd in claim 1, wherein said valves are associated with control means for causing simultaneous opening and closing thereof.

3. The injection device as claimed in claim 1, wherein said injection chamber and said duct for supplying this chamber with pressurized gas are formed inside a cylinder head closing the chamber of the cylinder at its upper part.

4. The injection device as claimed in claim 1, wherein nozzles are disposed in the injection chamber at the level of said orifices so that the outlet channels of the injector are directed towards the inner part of the nozzles.

5. The injection device as claimed in claim 4, wherein said nozzles are in the form of venturis.

6. The injection device as claimed in claim 1, wherein one at least of said orifices opening into the chamber of the cylinder comprises a jet deflector member.

7. The device as claimed in claim 6, wherein each of said orifices opening into the chamber of the cylinder comprises a jet deflector member.

8. The device as claimed in claim 7, wherein said deflectors orient the jets in different directions so as to better control the distribution of the jets in said chamber of the cylinder.

* * * * *